Aug. 27, 1935.  G. L. KOTHNY  2,012,456

WELL SURVEYING INSTRUMENT

Filed Aug. 12, 1930

WITNESS:

INVENTOR
Gottdank L. Kothny
BY
ATTORNEYS.

Patented Aug. 27, 1935

2,012,456

UNITED STATES PATENT OFFICE 2,012,456

WELL SURVEYING INSTRUMENT

Gottdank L. Kothny, Strafford, Pa., assignor to Sperry-Sun Well Surveying Company, Philadelphia, Pa., a corporation of Delaware Application August 12, 1930, Serial No. 474,687

1 Claim. (Cl. 234—5.3)

This invention relates to a well surveying device of the type adapted to be lowered into a bore hole and arranged to give a suitable record of the orientation of the hole at a given point.

The well surveying apparatus disclosed in the patent to Williston and Nichols, No. 1,960,038, dated May 22, 1934, is designed primarily to be lowered into a bore hole by means of a cable. Since descent under these conditions is quite rapid, exposures forming records of the slope of the hole are made at quite short intervals of, perhaps, just a few seconds. The resulting record will then give readings corresponding to depths so spaced that an accurate survey of the hole may be made.

While the lowering of the instrument on a cable results in easy and rapid readings, this method is preferably used only in surveying cased holes inasmuch as uncased holes, or portions of holes below the lower ends of the casings, may have pockets in the walls tending to either prevent withdrawal of the instrument, or momentarily arrest it during its descent with the result that snapping of the cable may occur if it drops suddenly after release. In view of this it is safer to lower the instrument on a drill stem whenever an uncased hole is being surveyed or where the instrument may pass beyond the casing in a cased hole.

If the instrument shown in the Williston and Nichols patent is lowered on the end of a drill stem, there results the production of an excessive number of exposures because of the slower descent caused by the time consumed in joining successive lengths of pipe. The result of this is an excessive drain on the power supply tending to materially reduce the battery voltage. Furthermore the unnecessarily large number of readings renders difficult the formulation of the results, many of the readings being taken at the same positions.

It is accordingly the broad object of the invention to provide a device of the character described in which readings are taken at long intervals suitable for the character of its use.

Other detailed objects of the invention will be apparent from the following description read in conjunction with the accompanying drawing, in which.

Figure 1:
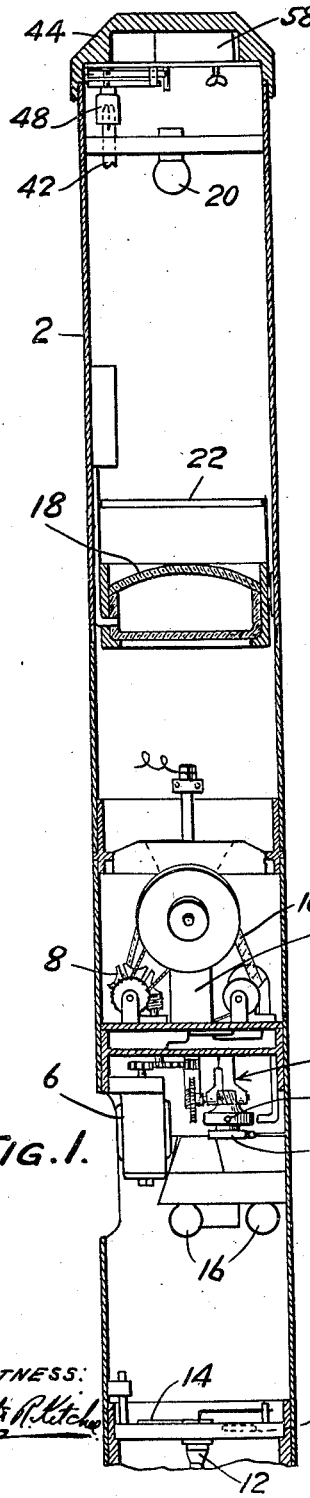
Fig. 1 is a longitudinal section through the upper portion of the instrument containing case of the surveying instrument.

The instrument, which is of the type illustrated in the said Williston and Nichols patent, comprises, as is usual, a protective outer casing, not shown, in which is located the power supply in the form of suitable batteries, and the casing 2, which contains the various recording instruments. The instrument casing 2 is made up of a plurality of sections, permitting easy assembly and disassembly and contains in its central portion a camera 4 adapted to take pictures in opposite axial directions. A motor 6 drives, through suitable reduction gearing, a Geneva mechanism, indicated at 8, which produces intermittent movement of the motion picture film 10, suitable exposures being produced in this mechanism not by the use of shutters, but by intermittent illumination of the instruments by suitably located lamps.

In the lower portion of the instrument casing there is located a gyroscope the vertical gimbal ring of which is illustrated at 12 and carries a pointer 14 movable over a suitable scale. Located adjacent the path of pointer 14 is a suitable chronometer 15. Three lamps 16 serve to intermittently illuminate the pointer 14, the scale adjacent which it moves, and the face of the chronometer, which preferably is a small watch of non-magnetic type so as not to be affected either by earth fields or by the magnetic fields produced by the gyroscope motor.

Above the camera and arranged to be photographed thereby is a fixed level 18 which is illuminated by a lamp 20, a suitable opal plate 22 being interposed to diffuse the light so that a sharp image of the bubble in the level may be produced in the camera. The surface of the level is provided with suitable calibrations in the nature of concentric circles indicative of the angle which the instrument assumes. All of the elements so far mentioned are more fully described in the Williston and Nichols Patent.

Figures 2, 6:
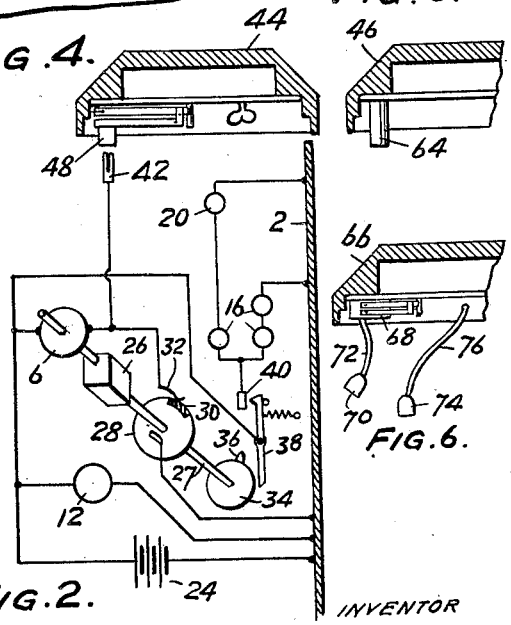
Fig. 2 is a wiring diagram of the instrument.
Fig. 6 is a sectional view illustrating a modification.

Referring now to Fig. 2, in which the wiring diagram of the instrument is illustrated, together with two alternatively usable caps for enclosing its upper end, the power supply is conventionally illustrated at 24. Preferably this power supply is a battery of suitable voltage for driving the gyroscope 12 and the motor 6, being in one preferred form a twenty-four volt battery. Using a battery of this voltage, it is preferable to arrange the four lamps which normally operate at 12 volts each in a parallel-series arrangement, as shown.

The motor 6 drives, through suitable reduction gearing 26 shown in Fig. 1 and illustrated diagrammatically in Fig. 2, a shaft 27 which carries a conducting disc 28 provided with an insulated insert 30. The disc is constantly grounded by a suitable brush or through the shaft 27 to the casing. A brush 32 bears on the periphery of the disc in the position of rest, being insulated therefrom by engaging the insulating segment 30.

Also mounted on shaft 27 is a disc 34 carrying a finger 36 which, on contacting with a switch lever 38, effects closure of the circuit including the lamps 16 and 20 at 40.

Joined to the line between brush 32 and the motor 6 is a plug 42 which is adapted to selectively engage within suitable sockets carried by metallic caps 44 and 46, either of which is adapted to close the upper end of the instrument casing. The cap 44 carries a socket 48 electrically connected to a leaf spring 50 on the end of which is secured a projection 52 extending over a second leaf spring 54 insulated from the first and electrically grounded to the cabinet. The ends of the springs 50 and 54 are adapted to be engaged by a pin 56 of insulating material and in the form of a semi-cylinder rotatably driven by clockwork 58 contained within the cap. The pin 56 is supported by a disc which may be removed from the clockwork mechanism and replaced by a second disc carrying two or more pins 60 and 62, each of which is similar to pin 56. The purpose of this substitution will be later brought out.

The alternative cap 46 is provided with a socket 64 electrically grounded thereto.

In the operation of the device the shaft 27, when driven by motor 6, will make one revolution, effecting closure of contact 40, producing an illumination of lamps 16 and 20 and thereby an exposure of film and thereafter a feed of the film through a suitable distance to bring another portion into position for exposure. Alternatively, of course, during each revolution of shaft 27 a feed may occur prior to the exposure, or the feed may take place in steps both before and after exposure.

Assuming cap 46 to be used on the instrument, the plug 42 will be grounded. The circuit, including brush 32, will thus be short circuited. As a result shaft 27 will continuously revolve and successive exposures of the film with intermittent feed thereof will take place at short intervals. The cap 46 will thus effect proper operation of the instrument when it is lowered rapidly into a bore hole by a cable.

Figure 5:
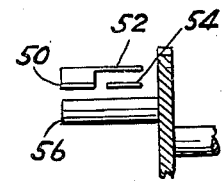
Fig. 5 is a fragmentary section viewed from the right of Fig. 4.

On the other hand, let it be assumed that cap 44 is used, in which case plug 42 will contact with socket 48. Under these conditions the motor 6 will operate upon closure of either of two alternate circuits, the first being through the leaf springs 50 and 54 and the second being through brush 32 and disc 28. In a position of rest, the brush 32 will rest upon the insulating segment 30 and the springs 50 and 54 will not be engaged by the pin 56, but will rest in adjacent positions, as indicated in Fig. 5, with the extension 52 free of the upper surface of the spring 54. As the clockwork mechanism now operates, the pin 56 will engage both of the springs 50 and 54 slowly flexing them together. Since spring 50 is shorter than spring 54, it will be the first to drop off the pin 56, whereby extension 52 will engage spring 54, thereby closing the circuit through the motor 6. As soon as this occurs the motor will start to revolve, causing insulating segment 30 to move past the brush 32 whereupon the parallel-circuit through 32 and disc 28 will be closed. After this occurs, pin 56 rides from beneath the end of spring 54, permitting it to drop into parallelism with spring 50, thus opening the circuit. The motor 6 will, however, continue to revolve, by reason of the engagement of disc 28 with brush 32, until shaft 27 makes one complete revolution and brush 32 again rides upon the insulating segment 30, opening the circuit. As stated above, the complete cycle of operation occurs during a single revolution of shaft 27, the pin 36 closing the lamp circuit for the production of an exposure and the mechanism 8 being operated for the advancement of the film. Another exposure will not occur until the pin 56 again revolves into position to effect closure of the circuit at 52.

As a result of this arrangement it will be seen that exposures can be produced at long intervals determined by the revolution of pin 56. Since motor 6 is only energized during a very short interval determined by the rotation of shaft 27, it will be seen that there is no great drain upon the battery 24 except such as is produced by the gyroscope.

By using a slowly rotating single pin 56, the exposures are widely spaced. For example, exposures may be made at intervals of two minutes. By replacing the pin 56 and the supporting disc by that illustrated in 54, in which two pins are provided, the intervals between successive exposures may be cut in half, each of the pins 60 and 62 operating in the same manner as a single pin 56.

The switch arrangement described is of particular value in that a quick make and break of the circuit is provided, eliminating excessive sparking, which would result in deterioration of the contacts. It is accordingly possible to supply the full current necessary for the motor 6 directly through these springs without the interposition of any relay.

The period during which the circuit is closed at 52 is determined by the time necessary to cause the segment 30 to ride beneath the brush 32 at a period when the battery voltage may have dropped off so as to materially decrease the speed of operation of the motor 6. On the other hand, the contact must not be so long as to maintain the circuit closed so that more than one revolution of shaft 27 may be made when the motor 6 is operating at its maximum speed, as otherwise two revolutions of the shaft would occur for each contact made at 52.

Figure 3:
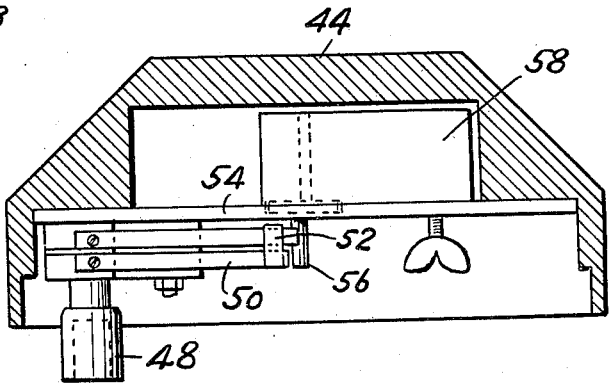
Fig. 3 is a transverse sectional view through one of the caps.
Figure 4:
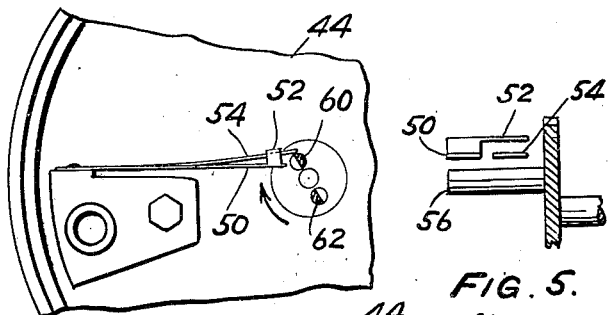
Fig. 4 is a fragmentary bottom plan view of the subject of Fig. 3.

Referring now to Fig. 6, there is illustrated an alternative form of cap 66 which alone takes the place of both the caps 44 and 46. This cap is provided with a socket 70 connected through an insulated cable 72 with the spring 68 corresponding to spring 50 and forming a part of the mechanism similar to that illustrated in Fig. 3. A second socket 74 is grounded through a cable 76 to the cap 66. By this arrangement either the socket 70 or the socket 74 may be engaged with the plug 42 effecting the two alternative forms of operation. Preferably an idle plug is provided to maintain the unused socket in inoperative position.

What I claim and desire to protect by Letters Patent is:

A well surveying device comprising a casing adapted to enter a bore hole, a removable cap for said casing, recording mechanism within the casing including direction indicating means and means for photographing said indicating means, a motor arranged to operate the photographing means, a battery for driving the motor, clockwork mechanism, and a switch controlled by the clockwork mechanism, said clockwork mechanism and switch being carried by said cap, said motor being operated by the battery under control of the switch when the cap is in place on the casing, whereby intermittent operation of the motor under control of the clockwork mechanism is effected.

GOTTDANK L. KOTHNY.